United States Patent [19]
Sullins et al.

[11] Patent Number: 5,103,473
[45] Date of Patent: Apr. 7, 1992

[54] TELEPHONE SYSTEM COMMUNICATION MECHANISM EMPLOYING CENTRAL OFFICE SLEEVE LEAD

[75] Inventors: Leslie A. Sullins, Ojai; Michael D. Horton, Port Hueneme; Ben A. Pierce, Camarillo, all of Calif.

[73] Assignee: Harris Corporation, Melbourne, Fla.

[21] Appl. No.: 679,925

[22] Filed: Apr. 3, 1991

[51] Int. Cl.[5] .......................... H04M 3/30; H04B 3/46
[52] U.S. Cl. .......................................... 379/29; 379/23
[58] Field of Search .................. 379/29, 350, 352, 23

[56] References Cited

U.S. PATENT DOCUMENTS 3,773,986  11/1973  Tremblay .............................. 379/29
4,924,489   5/1990  Lawrence et al. .................... 379/29

Primary Examiner—Stafford D. Schreyer
Attorney, Agent, or Firm—Evenson, Wands, Edwards, Lenahan & McKeown

[57] ABSTRACT

A data communication and sleeve lead control apparatus provides auxilary signalling between a no-test trunk control unit, and another unit such as a pair gain unit which is coupled with the link between the control unit and the no-test trunk, while maintaining stability of the sleeve lead monitored by the no-test trunk. The appearance is installed within the pair gain unit, and effectively isolates the sleeve lead to the no-test trunk from sleeve lead to the no-test trunk control unit, so that the data communications between the control unit and the pair gain unit are transparent to the no-test trunk. During a prescribed sleeve lead current flow state, e.g. high resistance or low current flow, controlled interruption of sleeve lead current between the control unit and the pair gain unit effectively modulates the state of the sleeve lead therebetween, but does not change the intended current flow state applied by way of the sleeve lead output port to the no-test trunk.

12 Claims, 2 Drawing Sheets

TELEPHONE SYSTEM COMMUNICATION MECHANISM EMPLOYING CENTRAL OFFICE SLEEVE LEAD

FIELD OF THE INVENTION

The present invention relates in general to telephone systems and is particularly directed to a communication scheme that allows telephone system operation control units, such as telephone test and operation monitoring equipment in the central office, to communicate with one another using the sleeve lead of the telephone link, without disrupting the steady state current flow condition of the sleeve lead as seen by a unit, such as a no-test trunk, which is controlled by the state of the sleeve lead.

BACKGROUND OF THE INVENTION

In addition to conducting signalling, voice and data communications via the tip and ring leads of a multi-lead telephone link (containing tip, ring, sleeve and ground leads), the sleeve lead may be used for controlling the operation of a unit, such as a no-test trunk (NTT). For example, U.S. Pat. No. 4,841,560, to A. Chan et al, entitled "Direct Access Test Unit for Central Office," issued June 20, 1989, assigned to the assignee of the present application and the disclosure of which is herein incorporated, describes a direct access test unit (hereinafter referred to as a DATU) that is installed within the equipment frame of a central office for the purpose of enabling a craftsperson to conduct tests of subscriber lines without the intervention of central office personnel. A primary function of the DATU is to control the operation of a no-test trunk within the central office.

For this purpose, the DATU may place the sleeve lead into one of a plurality (five) of predefined current flow states, each of which may be associated with a specific operational condition of the no-test trunk. Moreover, transitions between two different sleeve states may be used to invoke preselected no-test trunk operations. In such a system, regardless of which sleeve current flow state is associated with a particular control function, it is important that continuity of the sleeve current flow state, as monitored by the no-test trunk, be maintained, so that there is no disruption of intended no-test trunk operation.

SUMMARY OF THE INVENTION

In accordance with the present invention, advantage is taken of the availability of the sleeve lead for auxiliary signalling purposes (customarily exclusively dedicated to the above-enumerated control functions), in particular, the use of the sleeve lead for conducting data communications between a telephone system operation control unit, such as the above-referenced DATU, and another unit, such as a pair gain applique, which are coupled with a unit such as a no-test trunk, the operation of which is controlled by the current flow condition of the sleeve lead as established by the DATU.

For this purpose, installed within the pair gain applique is a communication and sleeve lead control apparatus which enables the DATU to use the sleeve lead to conduct data communications with the pair gain unit, on the one hand, while maintaining the integrity of the current flow state of the sleeve lead as seen by the no-test trunk, on the other hand, thereby preventing disruption of the intended control of the operation of the no-test trunk from the DATU during the exchange of data communications between the DATU and the pair gain unit.

The sleeve lead communication and control apparatus of the present invention is incorporated in the circuitry of the pair gain unit, such that it is effectively inserted in the link between the DATU and the no-test trunk. Supervisory monitoring and control of the operation respective switching and detection components of the sleeve lead communication and control apparatus are performed by a the pair gain unit's resident microcontroller. Connection to the input sleeve lead from the DATU is by way of a first 'sleeve in' port, while connection to the output sleeve lead to the no-test trunk is by way of a second 'sleeve out' port. First and second coupling ports of a first switching (relay) circuit are coupled in circuit with the first and second sleeve lead ports and normally couple the first port to the second port, thereby providing a sleeve lead communication path from the DATU through the pair gain unit to the no-test trunk. A third coupling terminal of the first switching circuit is coupled through a second switching circuit, which controllably serves as a current modulation control circuit, to a sleeve lead state detector. The sleeve lead state detector detects the type of current flow condition that has been imparted to the sleeve lead by the DATU, i.e. whether the current flow state is a high impedance (low current) or low impedance (high current) condition.

A sleeve lead current flow detector is coupled to a fourth coupling terminal of the first switching circuit and is operative to detect an active current flow condition through the input sleeve lead from the DATU. The output of this detector is used to controllably operate the first switching circuit, so as to couple the first port to the sleeve lead state detector. A sleeve lead state control circuit is controllably coupled via a fifth coupling terminal of the first switching circuit to the second port, and is operative to controllably place the outgoing sleeve lead to the no-test trunk port in the same current flow state that has been detected by the sleeve lead state detector.

Data communications from the pair gain unit to the DATU are conducted by controllably interrupting the current flow path from the sleeve lead state detector, through the second switching circuit, to the first port, to which the input sleeve lead from the DATU is coupled. During a prescribed sleeve lead current flow state, e.g. high impedance or low current flow, controlled interruption of the current flow path through the second switching circuit effectively modulates the current flow state of the input sleeve lead from the DATU at the sleeve lead input port, but does not change the intended current flow state applied by way of the sleeve lead output port to the no-test trunk.

The communication format between the DATU and the pair gain unit is serial, half-duplex. There are two DATU-to-pair gain unit messages. The first consists of a sixty millisecond interruption of a low sleeve current condition and is representative of an idle line, if there has been no previous message within a set period of time, or a request for an line condition-representative answer, if there has been a previous inquiry message. The second is a 120 millisecond interruption of a low sleeve current condition and is representative of a busy line.

Pair gain-to-DATU messages consist of a synchronization ('1') bit followed by a prescribed digital code (e.g. a hexadecimal code). Each data bit within the multibit message is defined by the current flow condition of the sleeve lead to the DATU during a prescribed continuous segment (e.g. twenty milliseconds) of a time slot (e.g. sixty milliseconds) associated with that respective bit. A binary '1' corresponds to an open circuit or no current flow through the sleeve lead to the DATU. A binary '0' corresponds to a prescribed magnitude current flow condition, such as a low negative current flow condition of that sleeve lead. Thus, a pair gain-to-DATU message always begins with an interruption of the low sleeve current flow condition during a first sixty millisecond time slot. The respective states of the sleeve lead current for the next immediately succeeding four sixty second times slots form the digital code that makes up the reply message from the pair gain unit to the DATU.

DETAILED DESCRIPTION

Figure 1:
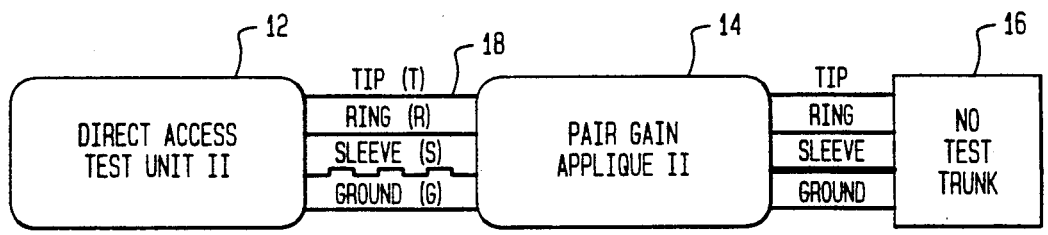
FIG. 1 diagrammatically illustrates the interconnection of a plurality of telephone system operation control units within a central office.

FIG. 1 diagrammatically illustrates the interconnection of a plurality of telephone system operation control units within a central office 10, in particular a direct access test unit (DATU) 12, a pair gain applique (PGA) unit 14 and a no-test trunk (NTT) 16 that are coupled to one another by way of a multi-lead telephone link 18, containing respective tip T, ring R, sleeve S and ground G leads, as shown. As described in the above-referenced Chan et al application, DATU 12 allows a craftsperson at a remote location to control the operation of no-test trunk 16 and thereby perform test functions on any subscriber line without the need for participation by central office personnel. To augment its ability to test subscriber lines other than those originating in the central office, the system may contain one or more auxiliary control units, such as pair gain applique unit 14 which affords access to and testing of pair gain system telephone lines.

As noted earlier, DATU 12 controls the operation of no-test trunk 16 by placing sleeve lead S into one of five prescribed current flow states, comprising open sleeve (no current flow), low negative sleeve, high negative sleeve, low positive sleeve and high positive sleeve. Moreover, transitions between two different sleeve states may be used to invoke preselected no-test trunk operations. Thus, for example, where the circuit is referenced to negative battery rails, the DATU may employ sleeve lead current flow transitions among low and high negative polarity current flow and an open circuit condition (no current flow) to establish a set of no-test trunk control functions as follows:

OPEN TO HIGH NEGATIVE

Requests the attention of the no-test trunk. The sleeve lead is previously in the "idle" state (open), so that equipment wishing to use the no-test trunk must request recognition.

HIGH NEGATIVE TO LOW NEGATIVE

Follows the dial pulsing or multifrequency tone generation of the digits of the subscriber's line to be tested on the no-test trunk. The no-test trunk is placed in a "cut-through" state, where the equipment attached to the no-test trunk is, in turn, connected to the subscriber's line to be tested. Since the equipment employs low negative sleeve, the equipment will be connected outward, towards the subscriber's drop. The subscriber's tip and ring will be available for the equipment connected to the no-test trunk.

LOW NEGATIVE TO OPEN

Puts the no test trunk in a "hold" state. In this state, the no-test trunk does not drop the subscriber's line to which it is connected, but rather waits for further instructions about what is to be done with the line. The subscriber's tip and ring are not available for use by the equipment during the open sleeve state.

OPEN TO LOW NEGATIVE

Instructs the no-test trunk to return from the "hold" state previously requested by a "low negative to open" transition. After this transition, the no-test trunk is in the same state it was in following the "high negative to low negative" transition (i.e., the subscriber's tip and ring are once again available for the equipment's use).

LOW NEGATIVE TO HIGH NEGATIVE

Requests disconnection from the subscriber's line.

HIGH NEGATIVE TO OPEN

Places the no-test trunk in an "idle" condition. Equipment connected to the no-test trunk has no further requests at this time.

The present invention augments the use of the sleeve lead to perform the above-enumerated test unit control functions, by enabling the sleeve lead to carry data communication signals between telephone system operation control units, such as the above-referenced DATU and a pair gain applique unit, while maintaining the integrity of the current flow state of the sleeve lead as seen by the no-test trunk and thereby preventing disruption of the intended control of the operation of the no-test from the DATU during the exchange of data communications between the DATU and the pair gain unit.

Figure 2:
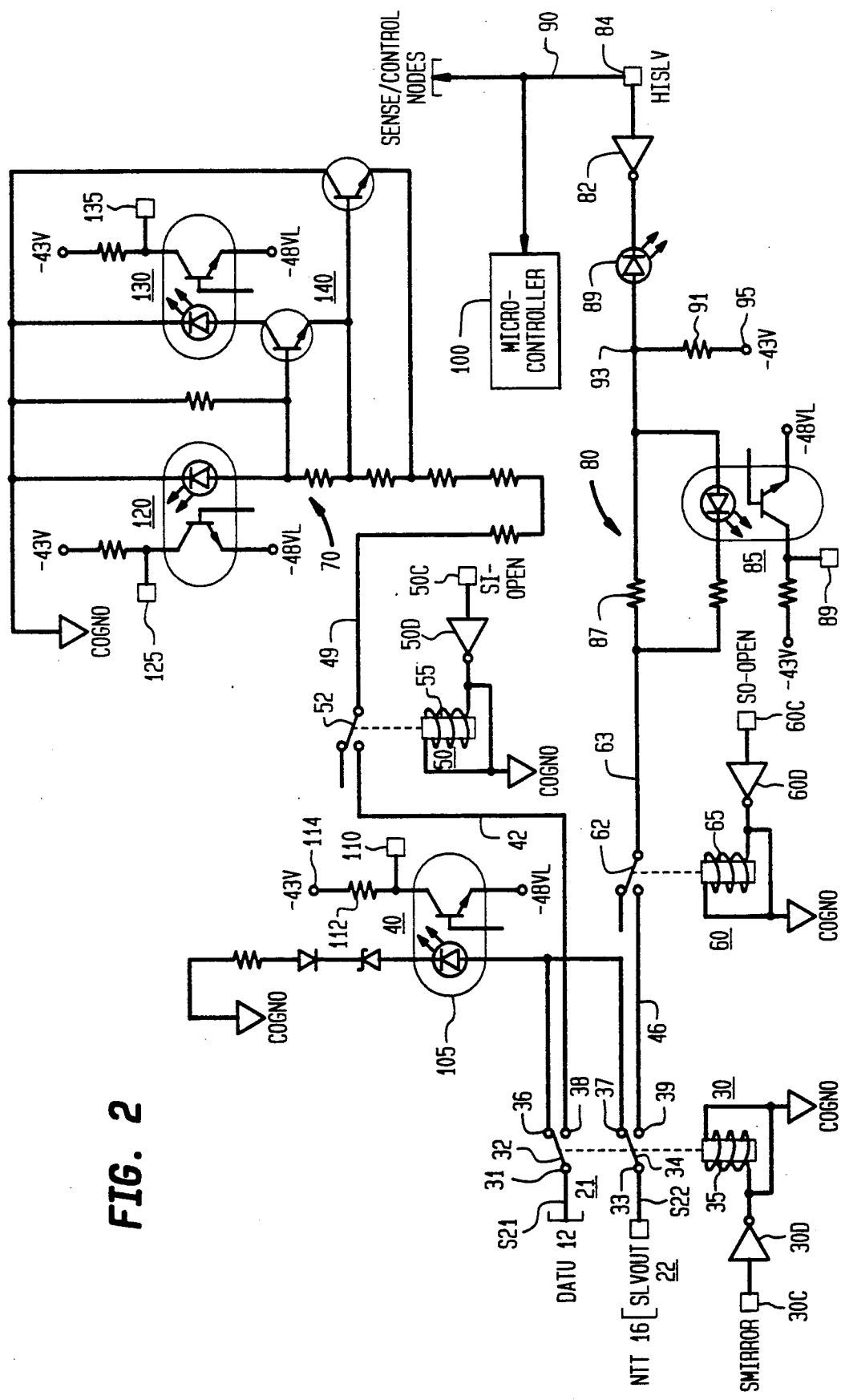
FIG. 2 schematically illustrates a communication and sleeve lead control circuit arrangement in accordance with the present invention.

For this purpose, the pair gain applique is modified to include a communication and sleeve lead control circuit arrangement schematically illustrated in FIG. 2 as comprising a first, 'sleeve in' port 21, to which a sleeve lead S21 from DATU 12 is coupled, and a second, 'sleeve out' port 22 to which a sleeve lead S22 to the no-test trunk 16 is coupled. 'Sleeve in' port 21 is coupled to a first terminal 31 of a first sleeve lead bridging relay or switching circuit 30 comprised of set of ganged relay contacts 32, 34 which are controllably switched between normally open and normally closed positions by a relay coil 35. Relay coil 35 is controllably energized by a relay coil driver 30D in accordance with a control signal from a micro-controller 100 at control node 30C. Control node 30C, like control nodes for each of the respective relays of the circuit, as well as activity detection nodes, to be described below, is coupled to a micro-controller communication bus 90 through which sensor activity signals from respective detection nodes in the control circuit and output control signals from supervisory control micro-controller 100 are coupled in the course of operation of the circuit. Micro-controller is driven by pair gain application software in an on-board control memory. Since the details of the pair gain application program are not necessary for an understanding of the present invention, they will not be described here. Instead, circuit operations effected by that aspect of the control program which controls the sleeve lead communication and control arrangement of FIG. 2 will be described below in terms of actually detected sleeve lead activity states and control signals that are asserted by the micro-controller in response to those states.

'Sleeve out' port 22 is coupled to a second terminal 33 of relay 30. A third terminal 36 associated with relay contact 32 is coupled to a sleeve lead activity (current flow) detector 40 and to a fourth terminal 37, associated with relay contact 34. In the de-energized state shown in FIG. 2, relay 30 provides a sleeve lead communication path from 'sleeve in' port from the DATU, through the normally closed switch contacts of relay 30 and to the 'sleeve out' port 22, to which the sleeve lead to the no-test trunk is connected.

A fifth terminal 38 of relay 30, associated with relay contact 32, is coupled via link 42 to one side of a normally open relay contact 52 of a second reply message 'modulation' relay or switching circuit 50. Relay 50 has a relay winding 55, which is controllably energized by a relay coil driver 50D in accordance with a control signal from a micro-controller at control node 50C. A second side of relay contacts 52 is coupled via link 49 to a sleeve lead state detector 70.

A sixth terminal 39 of relay 30, associated with relay contact 34, is coupled via link 46 to one side of a normally open relay contact 62 of a third 'sleeve open' relay or switching circuit 60. Relay 60 has a relay winding 65, which is controllably energized by a relay coil driver 60D in accordance with a control signal from a micro-controller at control node 60C. A second side of normally open relay contact 62 is coupled via link 63 through a sleeve lead current monitor circuit 80 to an sleeve lead output current driver 82 to which a sleeve output current control node 84 is coupled. As pointed out previously, as is the case of each of the control nodes for the respective relays, sleeve current driver control node 84 is coupled to a micro-controller communication bus 90 through which sensor activity signals from respective detection nodes in the control circuit and output control signals from a supervisory control micro-controller 100 are coupled.

Sleeve lead current monitor circuit 80 comprises an electro-optic coupler circuit 85, coupled across resistor 87 which is in circuit with an LED 89 at the output of sleeve lead output current driver 82. A sleeve lead resistor 91 is coupled between a node 93 and a negative high voltage terminal 95. Depending upon the output state of sleeve lead output driver 82, as defined by the control signal applied to its control node 84 from the micro-controller, sleeve lead termination resistor 91 will either be in series with sleeve lead resistor 87 (node 93 being at a less negative potential than terminal 95), thereby producing a high sleeve lead resistance or low sleeve current state) or effectively bypassed (node 93 being at the same potential as terminal 95).

Sleeve lead current monitor circuit 80 has an output node 89 coupled to micro-controller bus 90. The binary level at node 89 is employed by micro-controller 100 in order to confirm whether or not the central office has removed its termination resistance on the sleeve output lead to produce an open circuit, or no sleeve lead current flow, condition.

Sleeve current flow detector 40 comprises an electro-optic coupler 105 having a sleeve current active output node 110. Node 1 110 is normally biased high through termination resistor 112 to negative voltage terminal 114. In response to sleeve lead current flow, electro-optic coupler 40 turns on, driving node 110 low ($-48$ V), thereby informing the micro-controller that the DATU has asserted sleeve lead current.

Sleeve lead state detector 70 comprises a first electro-optic coupler 120 coupled in circuit with lead 49 from current modulation relay circuit 50. It also includes a second electro-optic coupler 130 coupled via a differential threshold circuit 140 to line 49. Differential threshold circuit 140 sets the threshold response of electro-optic coupler 130 to a high sleeve current level (low sleeve lead resistance asserted by the DATU), while electro-optic coupler 120 is responsive to both low and high magnitude sleeve currents. As a result, during a low sleeve state (DATU asserts high sleeve resistance) output node 125 from electro-optic coupler 120 goes low, whereas output node 135 of electro-optic coupler 130 stays high. For a high sleeve state (DATU asserts low sleeve resistance), both output node 125 of electro-optic coupler 120 and output node 135 of electro-optic coupler 130 go low. For an open sleeve (no current flow) condition, neither electro-optic coupler turns on, so that both nodes 125 and 135 stay high. Nodes 125 and 135 are coupled to micro-controller bus 90 and are monitored by micro-controller 100 for setting the magnitude of sleeve lead current applied to output sleeve lead S22 by sleeve lead current driver 82.

OPERATION

In its idle state configuration shown in FIG. 2, with each of relays 30, 50 and 60 de-energized, sleeve lead input port 21 is directly coupled through the normally closed contacts 32, 34 of relay 30. So long as there is no sleeve current flow (sleeve lead open circuited) the output node 110 of electro-optic coupler 105 remains high. In response to the DATU asserting (negative) sleeve current high or low, electro-optic coupler 40 senses the change in state and causes node 110 to be asserted low. In response to node 110 going low, micro-controller 100 enables relay 30 via control node 30C and relay circuit 50 via control node 50C, thereby coupling sleeve lead input port 21 to sleeve lead state detector 70. Depending upon the magnitude of the sleeve current is low or high, one or both of nodes 125, 135 of sleeve lead state detector 70 will be asserted low, in response to which micro-controller 100 applies either a low sleeve current or high sleeve current representative control level to sleeve lead current driver 82. As described above, the output of sleeve lead output driver 82, as defined by the control signal applied to its control node 84 from micro-controller 100, will control whether or not sleeve lead termination resistor 91 forms part of the sleeve lead resistance to the no-test trunk. For a low sleeve lead current state asserted on input sleeve lead S21, resistor 91 is placed in series with sleeve lead resistor 87, producing a high sleeve lead resistance. Conversely, for a high sleeve lead current state asserted on input sleeve lead S21, resistor 91 is effectively bypassed, so that the sleeve lead resistance is determined by resistor 87, corresponding to a low sleeve lead resistance and replicating, on output sleeve lead S22, a high sleeve lead current state that has been asserted on input sleeve lead S21.

After establishing the requisite sleeve lead resistance, micro-controller 100 applies an enable signal to control node 60C of relay circuit 60, thereby closing its normally open contact 62, thereby coupling the output of sleeve current driver 82 through closed contacts of relay circuits 30 and 60 to sleeve lead output port 22. Thus, the intended sleeve lead current magnitude asserted by DATU 12 on sleeve lead S21 is replicated via sleeve lead output port 22 on sleeve lead S22 to no-test trunk 16.

As listed above, for the respective open, low and high sleeve current flow conditions, DATU 12 may invoke any of six control transitions depending upon the current flow state of the sleeve lead. For the present condition of low or high sleeve current flow, a transition to the other current flow magnitude (high or low) will cause a change in state in output node 135 of sleeve lead state detector 70. Micro-controller 100 responds to this change in state at node 135 by changing the control input to node 84. As a result, the voltage at node 93 changes state, causing the series connection of resistor 91 and negative voltage terminal 95 to either be removed from or inserted in series with resistor 87, thereby changing the magnitude of the sleeve current through lead 63, the closed relay contacts of relays 30 and 60 and sleeve lead S22.

For a transition from a low or high sleeve current to an open circuit state, the output of node 110 of current flow detector changes state from low to high. Micro-controller 100 measures the length of time that node 110 remains high in order to determine whether or not the transition is a DATU control transition directed to NTT 16, or whether the transition corresponds to a data communication inquiry message from the DATU to the pair gain unit.

As noted earlier, in accordance with the invention, data communication messages from the DATU consist of prescribed duration interruptions (60 ms or 120 ms) of low sleeve lead current. Thus, a low sleeve current interruption in excess of 300 milliseconds will be identified as a low sleeve to open transition which puts the no test trunk in a "hold" state. Namely, the pair gain unit 'sees' its own transmissions as if transmitted by the DATU. If the pair gain unit sends a binary '11111', the open interval is 5 'bit times' (syncbit + 4 data bits). With a single bit time of 60 ms, the open interval is 300 ms.

For either a high sleeve current-to-open transition or a long duration low sleeve current-to-open transition, micro-controller 100 terminates sleeve lead current flow by asserting node 60C high, thereby de-engaging relay 60 and opening relay contacts 62, and causing an open circuited output sleeve lead. Since the DATU has terminated current flow in input sleeve lead S21, micro-controller 100 may now safely de-energize relay 30 and return contacts 32 and 34 to their original normally closed, idle condition. Also, relay 50 is de-energized, in order to open the current flow path through link 49 to sleeve lead state detector 70.

DATA COMMUNICATIONS DATU-TO-PAIR GAIN MESSAGES

Figure 3:
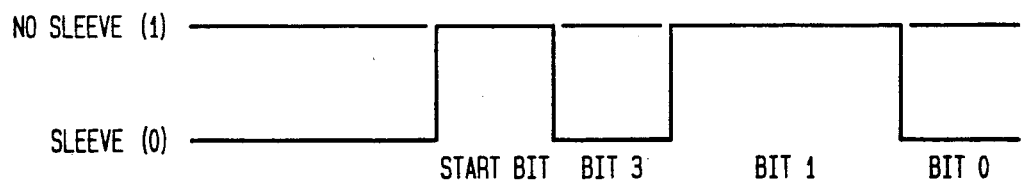
FIG. 3 shows the format of a data communication message used by the arrangement of FIG. 2 for transmitting reply messages from the pair gain unit to the DATU.

As explained previously, data communication messages from the DATU take the form of sleeve lead current interruptions of a finite duration of either 60 ms or 120 ms. These prescribed current interruptions are reflected by corresponding changes in state of current detector node 110. Unlike the case of a control transition, however, micro-controller 100 does not respond by changing the sleeve current applied to the sleeve lead output port 22. Instead, relays 30 and 60 remain energized, so as to maintain the sleeve current flow path from node 93 to sleeve lead output port 22. Micro-controller 100 responds to the DATU inquiry message with a five-bit reply message having a format in the exemplary message shown in FIG. 3. Specifically, a reply message consists of a first synchronization '1' bit followed by four data bits, where a '1' bit is represented by an interruption of current flow (open circuit condition) for a continuous period of 20 ms within a respective 20 ms bit period.

Micro-controller 100 sources return message to the DATU by controllably interrupting the low current condition on sleeve lead S21 from DATU 12. For this purpose, micro-controller 100 initially de-energizes relay 50 for an initial 60 ms, thereby opening the current flow path over lead 42 and lead 49 to sleeve lead state detector 70. This interruption of the sleeve lead current path through line 49 is reflected as a 60 ms open circuit pulse on sleeve lead S21 to DATU 12. Depending upon the particular reply message to be generated, as tabulated in the Table below, micro-controller 100 will controllably open relay 50 to produce one of the bit sequences of the Table. At the end of the 300 ms interval of the reply message, the previous sleeve lead state is restored, by a steady state energizing of relay 50 and providing a continuous sleeve lead current path through its closed contact 52.

TABLE

| |
| --- |
| 0000 (0) - Processing |
| 0010 (2) - Local Line |
| 0011 (3) - Good Single Party Line |
| 0100 (4) - Good Coin Line |
| 0101 (5) - Bad Channel |
| 0110 (6) - Bypass Pair busy or PGTC Failure |
| 0111 (7) - PGTC in Alarm |
| 1000 (8) - Channel Not Available |
| 1001 (9) - Pair Gain Line |
| 1010 (A) - Good Multi-Party Line |
| 1011 (B) - RESERVED |
| 1101 (C) - RESERVED |
| 1101 (D) - RESERVED |
| 1110 (E) - RESERVED |
| 1111 (F) - RESERVED |

As will be appreciated from the foregoing description, the present invention takes advantage of the availability of the sleeve lead for auxiliary signalling, such as controlling the operation of a no-test trunk, by installing within a pair gain unit, through which the sleeve lead is coupled between a controlling direct access test unit and a no-test trunk, a communication and sleeve lead control apparatus which enables the DATU to use the sleeve lead to conduct data communications between itself and the pair gain unit, while maintaining the integrity of the current flow state of the sleeve lead as seen by the no-test trunk, thereby preventing disruption of the intended control of the operation of the no-test trunk from the DATU during the exchange of data communications between the DATU and the pair gain unit. The data communication and control arrangement according to the invention effectively isolates the sleeve lead to the no-test trunk from sleeve lead to the DATU so that the data communications between the DATU and the pair gain unit are transparent to the no-test trunk.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. For use with a telephone system having a multi-lead telephone signalling link and a plurality of telephone operation control units coupled with said link, an apparatus, installed in a first of said units, for enabling said first unit to exchange messages with a second of said units by means of one of the leads of said multi-lead telephone signalling link comprising:

first and second ports coupled to said one lead;
   a lead state detection circuit, coupled to said first port, for detecting a modulation of an electrical condition of said one lead by said second telephone system operation control unit, representative of a message from said second telephone system operation control unit to said first telephone system operation control unit; and
   a lead state control circuit, coupled to said first and second ports and being responsive to the modulation detected by said lead state detection circuit, for modulating, via said first port, the state of said one lead to said second telephone system operation control unit, while effectively maintaining, via said second port, the steady state condition of said one lead.

2. An apparatus according to claim 1, wherein said one lead corresponds to a sleeve lead and wherein modulation of an electrical condition of said sleeve lead is effected by modulating current flow therethrough.

3. An apparatus according to claim 2, wherein modulation of an electrical condition of said sleeve lead corresponds to modulation of the state of said sleeve lead between an open state and a prescribed current flow state.

4. An apparatus according to claim 2, wherein said lead state detection circuit comprises a sleeve lead current flow detection circuit controllably coupled in circuit with said first port and providing an output representative of the current flow state through said sleeve lead, and wherein said lead state control circuit comprises a sleeve lead modulation circuit, coupled in circuit with said first port, and a lead state current flow control circuit coupled in circuit with said second port and operative to establish the current flow state of said sleeve lead at said prescribed current flow state.

5. For use with a telephone system having a multi-lead telephone signalling link and a plurality of telephone operation control units coupled with said link, an apparatus, installed in a first of said units, for enabling said first unit to exchange messages with a second of said units by means of a sleeve lead of said multi-lead telephone signalling link, while controlling the operation of a third of said units by means of said sleeve lead, comprising:

a first port to which a sleeve lead from said first unit is coupled;
   a second port to which a sleeve lead to said third unit is coupled;
   a first switching circuit which controllably couples said first port to said second port, thereby providing a sleeve lead communication path from said first unit to said third unit;
   a sleeve lead state detector which detects the type of current flow condition that has been imparted to the sleeve lead from said first unit;
   a sleeve lead current flow detector, coupled to said first port via said first switching circuit, for detecting current flow through the sleeve lead from said first unit and controllably operating said first switching circuit to couple said first port to said sleeve lead state detector;
   a sleeve lead current flow control circuit, coupled to said second port, for placing the sleeve lead coupled to said second port in the same current flow state as detected by said sleeve lead state detector; and
   a sleeve lead current modulator, coupled through said first switching circuit to said first port and being operative to modulate the current flow condition of the sleeve lead coupled to said first port.

6. An apparatus according to claim 5, wherein said sleeve lead current modulator comprises a second switching circuit, coupled between said first switching circuit and said sleeve lead state detector, for modulating the state of the sleeve lead coupled to said first port between an open state and said same current flow state.

7. For use with a telephone system wherein first and second signalling units are coupled to a sleeve lead of a telephone link to a central office no-test trunk, an apparatus, associated with a first of said signalling units, for enabling said first and second signalling units to communicate with one another via said sleeve lead comprising:

a first port coupled to a sleeve lead of a telephone link between said first and second signalling units;
   a second port coupled to a sleeve lead of a telephone link between said first signalling unit and said no-test trunk;
   a sleeve lead state detector, coupled to said first port, for detecting the presence of a modulation of the state of the sleeve lead between said first and second signalling units representative of a message from said second signalling unit to said first signalling unit; and
   a no-test trunk sleeve lead control circuit, coupled to said first and second ports and being responsive to the modulation detected by said sleeve lead state detector, for modulating the state of the sleeve lead between said first and second signalling units in accordance with a response message from said first signalling unit to said second signalling unit, while maintaining the state of the sleeve lead of the link from said first signalling unit to said no-test trunk.

8. For use with a telephone system having a multi-lead telephone signalling link containing tip, ring, sleeve and ground leads, and a plurality of telephone system operation control units which are coupled with said sleeve lead, an apparatus for enabling first and second ones of said telephone system operation control units to communicate with one another via said sleeve lead comprising:

first and second ports coupled to said sleeve lead;
   a sleeve lead state detector, coupled to said first port, for detecting a modulation of an electrical condition of said sleeve lead by said first telephone system operation control unit, representative of a message from said first telephone system operation control unit to said second telephone system operation control unit; and a sleeve lead state control circuit, coupled to said first and second ports and being responsive to the modulation detected by said sleeve lead state detector, for modulating the state of the sleeve lead to said first telephone system operation control unit in accordance with a response message from said second telephone system operation control unit, while effectively maintaining a steady state condition of said sleeve lead.

9. For use with a telephone system having a multi-lead telephone signalling link and a plurality of telephone operation control units coupled with said link, a method of enabling a units by means of one of the leads of said multi-lead telephone signalling link comprising:
(a) detecting modulation of an electrical condition of said one lead by said second telephone system operation control unit, said modulation being representative of a message from said second telephone system operation control unit to said first telephone system operation control unit; and
(b) in response to the modulation detected in step (a), modulating the state of said one lead to said second telephone system operation control unit, while effectively maintaining the steady state condition of said one lead.

10. A method according to claim 9, wherein said one lead corresponds to a sleeve lead and wherein modulation of an electrical condition of said sleeve lead is effected by modulating current flow therethrough.

11. A method according to claim 10, wherein modulation of an electrical condition of said sleeve lead corresponds to modulation of the state of said sleeve lead between an open state and a prescribed current flow state.

12. An apparatus according to claim 10, wherein step (a) comprises detecting sleeve lead current flow and providing an output representative of the current flow state through said sleeve lead, and wherein said step (b) comprises modulating sleeve lead current flow to said first unit and establishing the current flow state of said sleeve lead at said prescribed current flow state.

* * * * *